United States Patent
Qureshi et al.

(10) Patent No.: US 10,007,509 B1
(45) Date of Patent: Jun. 26, 2018

(54) CONTAINER HANDOVER FOR DEVICE UPDATES

(71) Applicant: Amazon Technologies, Inc., Seattle, WA (US)

(72) Inventors: Tipu Saleem Qureshi, Seattle, WA (US); Deepak Singh, Issaquah, WA (US); William Andrew Thurston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 14/963,097

(22) Filed: Dec. 8, 2015

(51) Int. Cl.
*G06F 9/44* (2018.01)
*G06F 8/656* (2018.01)
*G06F 9/445* (2018.01)
*H04L 29/08* (2006.01)
*G06F 8/61* (2018.01)
*G06F 8/65* (2018.01)

(52) U.S. Cl.
CPC ............... *G06F 8/656* (2018.02); *G06F 8/61* (2013.01); *G06F 8/65* (2013.01); *G06F 8/67* (2013.01); *H04L 67/34* (2013.01)

(58) Field of Classification Search
CPC .................................... G06F 8/65; G06F 8/61
USPC ........................................ 717/168, 171, 174
See application file for complete search history.

(56) References Cited

U.S. PATENT DOCUMENTS

| | | | |
|---|---|---|---|
| 6,594,780 B1 * | 7/2003 | Shen | G06F 11/1435 707/999.202 |
| 7,546,595 B1 * | 6/2009 | Wickham | G06F 8/65 717/168 |
| 7,849,459 B2 * | 12/2010 | Burkhart | G06F 8/60 717/108 |
| 8,171,483 B2 * | 5/2012 | Nord | G06F 9/5077 717/120 |
| 8,200,634 B2 * | 6/2012 | Driesen | G06F 8/65 707/610 |
| 8,473,444 B1 * | 6/2013 | McCarten | H04L 63/0263 706/47 |
| 9,268,935 B2 | 2/2016 | Lindo et al. | |
| 9,547,564 B1 * | 1/2017 | Troutman | G06F 8/61 |
| 9,692,666 B2 * | 6/2017 | Salokanto | H04L 41/5054 |
| 9,886,300 B2 * | 2/2018 | Nakatsu | G06F 9/45558 |
| 2008/0071651 A1 * | 3/2008 | Markel | G06F 8/00 705/30 |
| 2010/0039325 A1 | 2/2010 | van Rooyen et al. | |
| 2010/0202560 A1 | 8/2010 | Luo et al. | |

(Continued)

OTHER PUBLICATIONS

Maxim Tuovinen, "Reducing Downtime During Software Deployment", Aug. 4, 2015.*

(Continued)

*Primary Examiner* — Phillip H Nguyen
(74) *Attorney, Agent, or Firm* — Davis Wright Tremaine LLP

(57) ABSTRACT

A mobile device may provide virtualization of physical resources and containerization of software application. Various deployment strategies such as, a blue-green deployment strategy, may be utilized to perform application and other software updates between various containers of a mobile device. State information and other information from an active container may be provided to the update container during handover operations.

20 Claims, 8 Drawing Sheets

(56) References Cited

U.S. PATENT DOCUMENTS

2016/0234785 A1     8/2016  Gutpa et al.
2017/0090897 A1*    3/2017  Veereshwara ............. G06F 8/65

OTHER PUBLICATIONS

ISO/IEC 11889-1:2009 Information technology—Trusted Platform Module—Part 1: Overview.
ISO/IEC 11889-2:2009 Information technology—Trusted Platform Module—Part 2: Design Principles.
ISO/IEC 11889-3:2009 Information technology—Trusted Platform Module—Part 3: Structures.
ISO/IEC 11889-4:2009 Information technology—Trusted Platform Module—Part 4: Commands.
Trusted Computing Group, "TPM Main, Part 1 Design Principles," Specification Version 1.2, Level 2 Revision 103, Jul. 9, 2007, 182 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Revision 116, Mar. 1, 2011, 339 pages.
Wikipedia, "IEEE 802.11n-2009," retrieved from Wikipedia, the free encyclopedia, on Aug. 31, 2017, 13 pages.
Wikipedia, "IEEE 802.11ac," retrieved from Wikipedia, the free encyclopedia, on Aug. 31, 2017, 11, pages.

* cited by examiner

US 10,007,509 B1

CONTAINER HANDOVER FOR DEVICE UPDATES

CROSS REFERENCE TO RELATED APPLICATIONS

This application incorporates by reference for all purposes the full disclosure of co-pending U.S. patent application Ser. No. 14/963,086, filed concurrently herewith, entitled "VIRTUALIZED HARDWARE SUPPORT FOR MOBILE DEVICES."

BACKGROUND

The use of network computing and storage has proliferated in recent years. At least a portion of this proliferation may be attributed to virtualization of hardware and software resources providing additional support and flexibility for users of computing resource. The resources for network computing and storage are often provided by computing resource providers who leverage large-scale networks of computers, servers, and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers in part due to the flexibility afforded by virtualization. The usage of virtualized computing resources allows content providers and online merchants, among others, to efficiently and adaptively satisfy their computing needs, whereby the computing and storage resources used by the content providers and online merchants are added or removed from a large pool provided by a computing resource provider as needed and depending on their needs. Additionally mobile devices are quickly outgrowing other form factors and the development of mobile applications is growing and becoming more ambitious. Furthermore, the computing resources available to mobile devices are quickly growing and the capabilities of mobile devices are growing along with this growth.

BRIEF DESCRIPTION OF THE DRAWINGS

Various techniques will be described with reference to the drawings, in which.

DETAILED DESCRIPTION

Figure 1:
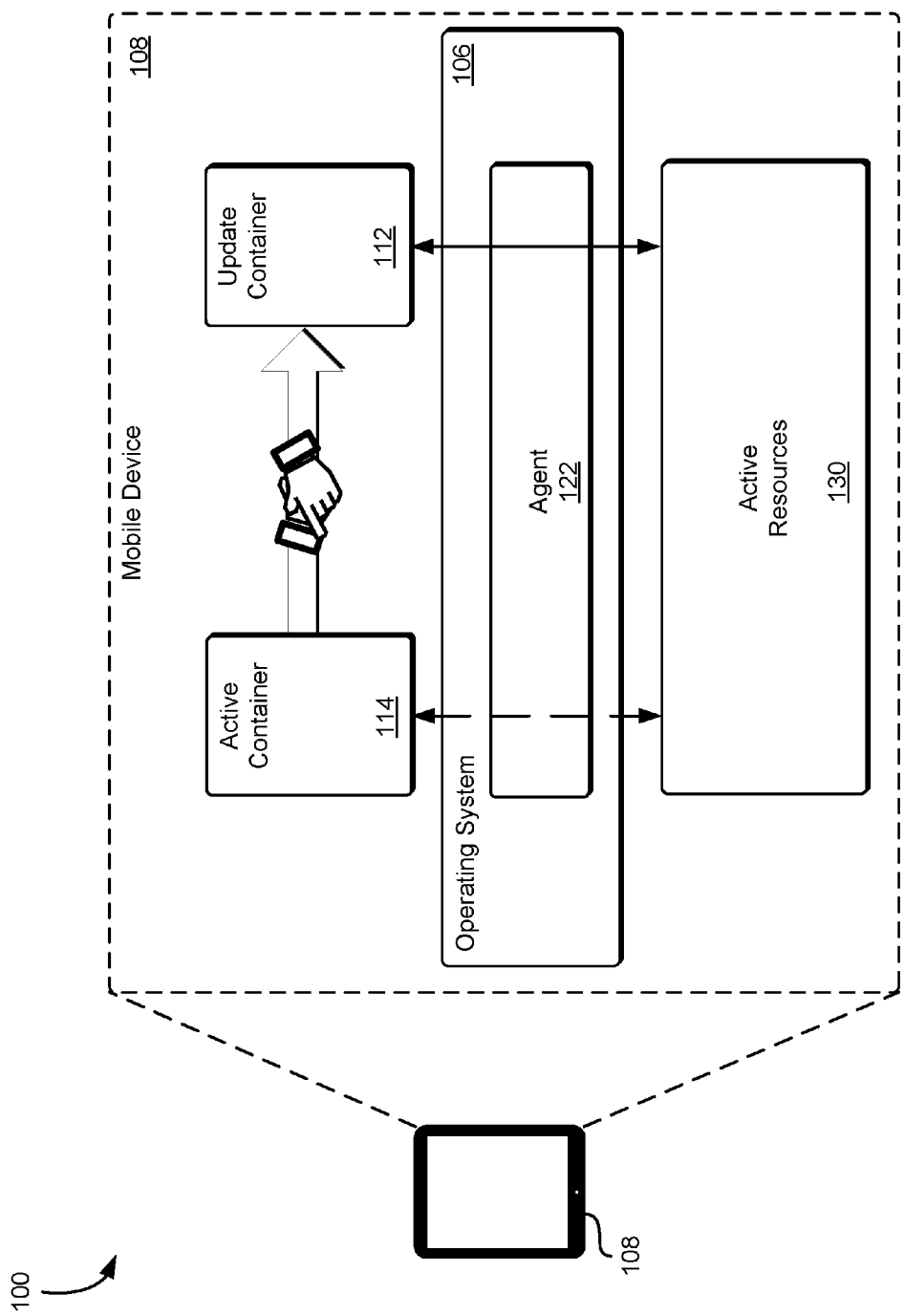
FIG. 1 illustrates an environment in which an agent executed by a mobile device may facilitate an active container handover in accordance with at least one embodiment.

In various examples described below, a 'blue-green' deployment strategy may be utilized with multiple containers of a mobile device to update applications and other software of the mobile device. Blue-green deployment is a release technique that may reduce downtime and risk by running two environments simultaneously. In one example, the active environment (e.g., the environment the user of the mobile device is utilizing) is called 'Blue' and the update environment, which may be currently under test, is called 'Green.' As the software or application update is being prepared in the Green environment the user may not be able to access the Green environment. However, once the Green environment has been fully tested the active user session may be handed over from the Blue environment to the Green environment. An agent may be used to manage and facilitated the active container handover and ensure that the user does not experience any failures or degradation of service as a result of the handover.

The agent may be responsible for carrying over (e.g., making available to the Green environment) the session information and/or state information for the active applications or software executing in the Blue environment to the Green environment. The various environments described herein may be executed in containers described in greater detail below. In one example, the agent may implement a shared cache (e.g., a mutually-shared memory and/or storage location) between applications or other software executing in each environment. A scheduling algorithm, described in greater detail below, may be used manage and control access to the shared cache. During handover operations the agent may manage a cooperative handshake of the shared cache between the environments. Alternatively, a diff operation may be performed between the memory of the environments and the result may be copied from the active environment to the update environment (e.g., from the Blue environment to the Green environment) prior to the handover. After a successful handover, the shared cache may be pruned to reduce an amount of memory used by the shared cache and free up computing resources of the mobile device. The agent may serialize data during the handover and ensure that the Green environment is operational before terminating the Blue environment.

In addition, physical resources of a mobile device may be virtualized to enable more efficient utilization of the physical resources by various applications and other software executed by the various environments (e.g., containers). In addition, containerization of operating systems and other applications executed by the mobile device may further increase efficiency and utilization of the computing resources of the mobile device. The containers may execute various tasks on behalf of the mobile device. The containers may be virtual machine instances configured to support containerization, and the software functions may be registered or deregistered from the mobile device's operating system to fit the needs of the mobile devices. Each container may contain a container agent, which may be an application configured to, when executed by one or more processors of a computer system such as the mobile device, perform various tasks with containers and applications included in the container, including registering containers, deregistering container, virtualizing hardware resources, splitting virtualized hardware resources, starting tasks, stopping tasks, queuing tasks, providing task statuses, signaling task heartbeats, and reporting task events. Various applications of the mobile device may include data and one or more instructions that, when executed in a container configured to support containerization, may be isolated from other processes running within the mobile device.

An agent executed by the mobile device may manage container access to virtualized hardware resources of the mobile device and may prioritize a queue request between the various containers of the mobile device. For example, the agent may initialize a container for testing various features and operations of the applications or other software executed by the mobile device (e.g., blue-green deployment). Furthermore, the agent may de-prioritize requests received from the container used for testing to reduce the impact on the computing resource available to one or more other containers utilized by the user of the mobile device. In such scenarios the containers utilized by the user of the mobile device may be given higher priority so the user does not experience a degradation in operation or service of the mobile device. A queueing system such as priority rings or other queues with priority may be used to prioritize request between various containers. In addition, other mechanisms to distribute the physical resources using virtualization techniques may be implemented. For example, the containers may be provided with a fixed amount of bandwidth distributed between one or more antennas of the mobile device.

In another example, the agent or container agent may utilize smart interrupts to prioritize the user's container or particular user operations over other containers or operations being performed, such as, automatically deprioritizing testing to a less privileged priority ring. Similarly, the agent may assign 'shares' or a percentage of physical resources between containers and/or applications of the mobile device. For example, the agent or other components of the operating system implemented by the mobile device may swap between 0% and 100% of the share of the virtual resource assigned to various containers during testing, such as the active user container or an update container. Independent of the mechanism used to split or otherwise divide access to the physical resources of the mobile device, a fairness algorithm for specifying constraints on various types of resources may be utilized. For example, the fairness algorithm may ensure that a background container receives at least some portion of the physical resources to function correctly. In addition, these fairness algorithms may be platform-specific, for example, certain mobile devices may have additional antennas or additional processing capabilities.

In the preceding and following description, various embodiments are described. For purposes of explanation, specific configurations and details are set forth in order to provide a thorough understanding of the embodiments. However, it will also be apparent, to one skilled in the art, that the embodiments may be practiced without the specific details. Furthermore, well-known features may be omitted or simplified in order not to obscure the embodiment being described.

FIG. 1 illustrates an aspect of an environment 100 in which embodiments may be practiced. As illustrated in FIG. 1, the environment 100 may include an agent 112 configured to implement an update to an application or software executed by a mobile device 108. The mobile device 108 may be any suitable computer system, mobile phone, smartphone, tablet, portable computer or combination thereof capable of supporting both physical hardware virtualization and software containerization. Furthermore, the mobile device 108 may include processors, memory, and other physical hardware, described in greater detail below, configured to enable the mobile device 108 to implement an operating system 106, agent 122, and a plurality container. As illustrated in FIG. 1, the mobile device 108 may execute an active container 114 and an update container 112.

The active container 114 may be the container currently being utilized by the user of the mobile device 108. For example, the active container 114 may include an operating system such as Android® or iOS® which is configured to present the user with an interface for executing various application and performing various operations, such as lacing phone calls or accessing a website. The active container 114 may include applications and/or other software that the user in currently interacting with or have previously interacted with in the past. In yet other embodiments, the active container 114 is a container with a version of an application, operating system, or other software that is to be updated and/or tested. In order to reduce the impact of this on the user, the operation involved in performing the update and/or test may be performed in the update container 112.

Furthermore, the resources of the mobile device 108 may be made available to other users and/or devices through virtualization of the resources and management of the virtualized resources by the agent 122. For example, the mobile device 108 may utilize the containers to provide a virtual operating system or application for users, and these users may then interact with the mobile device 108 through the virtual presence provided through the container. The agent 112 may be a component of the operating system 106 configured to manage the containers access to physical resources of the mobile device 108 and perform various operations involved in the active handover between containers, such as the active container 114 and the update container 112. For example, the agent 122 may be a set of computer instructions or other logic configured to enable the active handover between the active container 114 and the update container 112 by at least making active resources 130 utilized by the active container 114 available to the update container 112. The active resources 130 may include memory, processors, storage location, storage devices, antennas, state information, application data, user data, user preferences, or any other computing resources utilized by one or more containers executed by the mobile device 108.

The agent 112 may also prioritize access to the active resources 130 to particular containers based at least in part on one or more attributes of the containers described in greater detail below. For example, the active container 114 may have priority access to the active resources 130 prior to the handover and the update container 112 may have priority access to the active resources 130 after the handover. Furthermore, for the purposes of the present disclosure, in various embodiments when the agent 122 includes the set of computer instructions or other logic, performance of an operation by the agent 122 causes the underlying computer system (e.g., the mobile device 108) executing the set of computer instructions or other logic to perform the operation. The agent 122 may also be implemented by specialized hardware or virtualized hardware, such as a processor configured to perform the operations of the agent 122.

The operating system 106 may be any operating system suitable for running within the mobile device 108 and that provide isolation technology that enable containerization schemes to isolate virtualization instances, such as containers or software functions described in greater detail below, from other processes running under the operating system 106. Examples of such operating systems include various implementations of Linux® operating systems that support resource isolation features in the Linux kernel. Process isolation may be implemented with virtual address space (e.g., a namespace as described above), where a particular process address space is different from any other processes address space thereby preventing processed from accessing one another. As noted, the software functions and containers may be virtualized instances within the operating systems 106 launched from application images or other data objects in accordance with one or more task definitions, and may be allocated resources of the mobile device from the agent 122.

In some examples, a 'container' may refer to a computer system instance (virtual or non-virtual, such as a physical computer system running an operating system) that is configured to launch and run software functions. Thus, the containers may be configured to run the software functions within the mobile device 108 or operating system 106 of the mobile device in accordance with the task definition or other information defining various attributes of the container provided by the mobile device 108 or other entity, such as a software developer or user of the mobile device 108. One or more containers may comprise a cluster or may be otherwise organized to execute one or more operations in concert. In some examples, a 'cluster' may refer to a set of one or more containers that have been registered with the cluster to be distributed and/or perform various tasks. Thus, the containers may be one of many different containers registered with the cluster, and the other containers of the cluster may be configured to run the same or different types of software functions as the container. The containers within the cluster may be of different container types or of the same container type, and the mobile device 108 may have access to or interact with more than one cluster. Thus, the mobile device 108 may launch one or more clusters and then the agent 122 may manage user and application isolation of the software functions within each cluster or container through application programming interface (API) calls made to the operating system 106. For example, the agent 122 may obtain state information from the active container 114, which in some embodiments may be a cluster of containers, by providing API requests to the operating system 106.

A software function may be a lightweight virtualization instance running under a container that allows processes and data used by the processes within the software function to be isolated from other processes running in the same container or computer systems, such as the mobile device 108. Thus, the software functions may each be virtualization instances running under the operating system of the containers and executing in isolation from each other. Each of the software functions and/or containers may have their own namespace, and applications running within the software functions and/or containers are isolated by only having access to resources available within the container namespace. Thus, software functions may be an effective way to run one or more single applications within their own namespace. A container encapsulation system allows one or more software functions to run within a single operating instance without overhead associated with starting and maintaining virtual machines for running separate user space instances. An example container encapsulation system is the Docker® container engine. For example, an application may consist of several software functions, which software functions may be configured to perform operations on behalf of mobile devices 108. The software functions are executed in one or more containers, as described above, using computing resources of the mobile device 108, such as the active resources 130. Software developer may develop applications and software functions based at least in part on computing resources available to containers and the mobile device 108.

The software functions may be launched to have only specified resources from resources allocated to the containers; that is, a software function may be launched to have a certain amount of memory and to not utilize more than a specified amount of processing power. This may be managed by the agent 122. The resource allocation for the software functions may be specified in the task definition or determined by the agent 122 based at least in part on attributes of the software functions, containers, resources of the mobile device 108, active resources 130, active containers, background containers, user applications and/or user operations, or any other attribute suitable for determining an amount of resources to allocate. Multiple software functions may be running simultaneously on a single container, and the resources of the container may be allocated efficiently between the software functions, other containers 110, and/or clusters of containers. In some embodiments, the mobile device 108 may support running software functions 118 in containers from only one user. In other embodiments, the mobile device 108 may allow multiple users to have containers running on the mobile device 108. In the latter case, the mobile device 108 may provide security to ensure that the users are unable to access containers, clusters, or software functions of the other users.

Different types of tasks may have different resource requirements and may have different lifespans. Thus, the software functions may be dynamically scheduled to run by a scheduler service or other component of the agent 122 and/or operating system 106 independent of an underlying operating system of the containers 110, and as such, the underlying operating system of the containers 110 may be very basic. Alternatively, the containers 110 may be scheduled to run by a scheduler installed within the containers.

Figure 2:
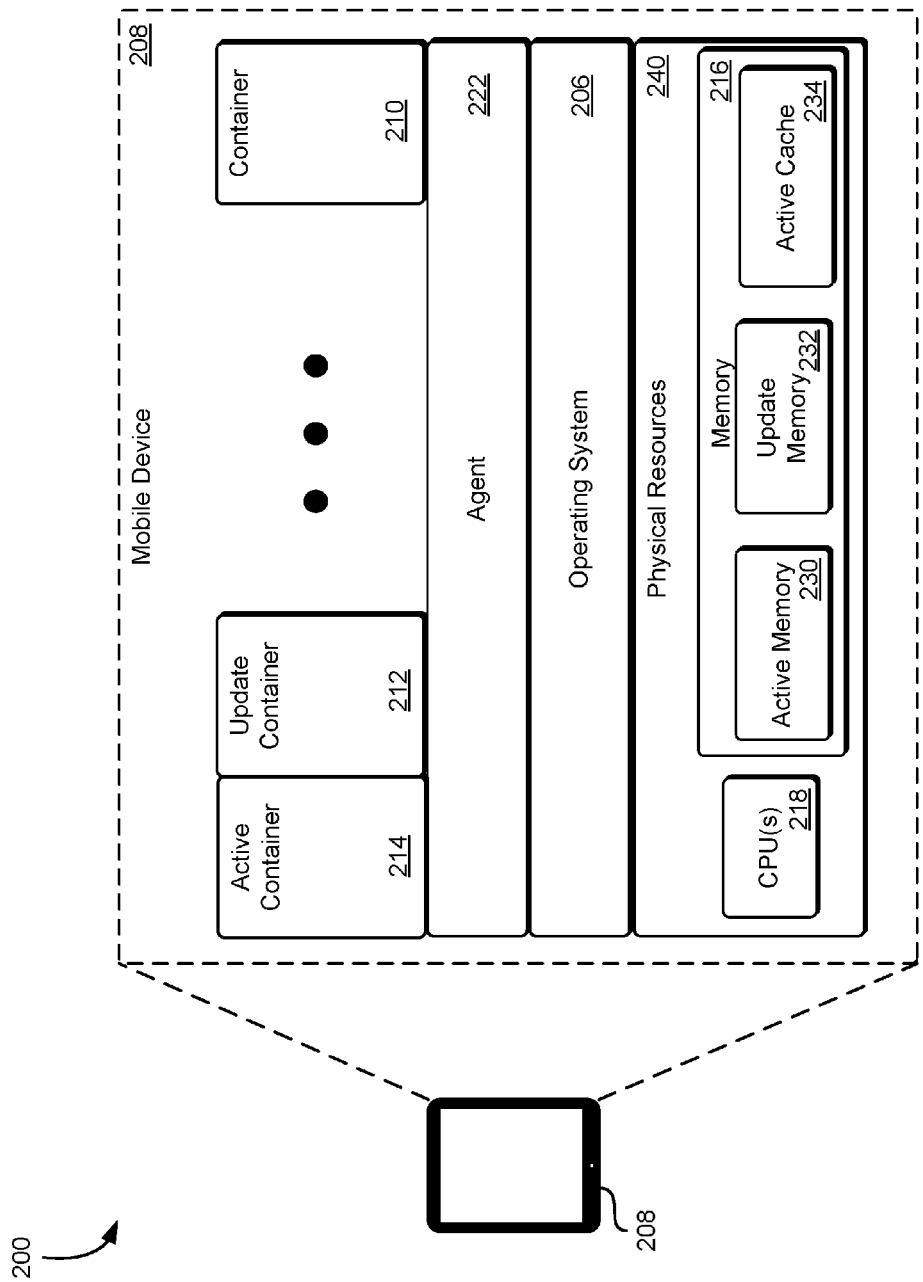
FIG. 2 illustrates an environment in which an agent executed by a mobile device may provide and manage virtualized hardware resources to containers executed by the mobile device in accordance with at least one embodiment.

FIG. 2 illustrates an aspect of an environment 200 in which embodiments may be practiced. As illustrated in FIG. 2, the environment 200 may include a user's mobile device 208 that may include physical resources configured to support the execution of various applications and other software implemented on the mobile device 208. The mobile device 208 may be any suitable computer system, mobile phone, smartphone, tablet, portable computer or combination thereof capable of supporting both physical hardware virtualization and software containerization. Furthermore, the physical resources 240 of the mobile device 208 may include one or more central processing units 218, memory 216, antennas, sensors, and other physical hardware, described in greater detail below, configured to enable the mobile device 208 to implement an operating system 206, agent 222, and containers 210 (e.g., an active container 214 and an update container 212. The memory may further include an active memory 230, update memory 232, and an active cache 234 configured to enable the agent 222 to manage an active handover operation between two or more containers 210.

The operating systems 206 may be any operating systems suitable for running within the containers 210 and/or for supporting the execution of the containers 210. The operating system 206 may provide isolation technology that enables containerization schemes to isolate virtualization instances, such as the containers 210, from other processes running under the operating system 206. Examples of such operating systems include various implementations of Linux operating systems that support resource isolation features in the Linux kernel. As noted, the container 210 may be virtualized instances within the operating systems 206 launched from application images in accordance with one or more task definitions, and may be allocated resources from the mobile device 208 by the agent 222.

The agent 222 may be a component of the operating system 206 or may be, as illustrated in FIG. 2, an application or other software separate and/or isolated from the operating system 206. The agent 222 may, as described above, manage and enable container access to the physical hardware 240 of the mobile device 208. For example, the agent 222 may, using API calls provided by the operating system 206, provide the containers 210 with virtual device drivers, physical resource state information, images of software applications, access to physical hardware 240, or other functions suitable for supporting one or more containers 210. The container 210 may include an additional operating system or other executable code configured to provide support for the operation of the containers 210.

The containers 210, such as the active container 214 and update container 212, may access the physical resources 240 of the mobile device 208 through one or more virtual interfaces provided by the agent 22 and/or operating system 206 or component thereof. The virtual interfaces may include virtual device drivers or similar interface such as a bare metal hypervisor. The virtual interfaces may include virtual processors and virtual memory devices. The agent 222 may, through a virtual device interface (e.g., virtual memory device), assign regions or area of the memory 216 to various containers. For example, the active container 214 may be provided access to active memory 230 to store application and user data. Similarly, the update container 212 may have access to update memory 232. The agent 222 may also maintain an active cache 234 which may include a reserved set of memory ranges of the memory 216 accessible to both the active container 214 and the update container 212, such that state information and other data may be provided to the update container 212 during handover operations.

During the handover requests directed to the active container 214 may be forwarded and/or copied to the update container 212. Additionally, after the handover is complete, the active container 214 may be maintained for an interval of time to ensure the successful operation of the handover procedure and successful operation of the update container 212. This may enable failover (e.g., reversion back to the active container 214 as the active user session) in the case of error. The interval of time may be set or otherwise adjusted based at least in part on the activities of the user of the mobile device 208. For example, if a user accesses or utilizes a particular application executed by the active container 214 intermittently (e.g., once every 3-5 days), the agent 222 may maintain the active container 214 until the expiration of an interval of time equivalent to the user's intermittent use.

Furthermore, the active cache 234 may include all of the resources utilized by the active container 214. The resources may include various computing resources such as application data, state information, virtual devices, memory ranges, ports, interrupts, applications, software functions, operating systems, virtual interfaces, databases, or any other computer resources that may be utilized by a container 210. Smart interrupts, as described above, may include interrupts that prioritize an active user session associated with a particular container over various back ground operations. In additions smart interrupts may include the use of CPU 'shares,' as described above, where the operating system may swap between 0% and 100% of the share of resources assigned to respective (i.e., active vs. background) containers 210. Additionally, the active cache 234 may include a copy of the resources. For example, the active memory 230 may include a set of application data, and the agent 222 may copy the set of application data to the active cache 234 so that the set of application data may be available to the update container 212 during and after completion of the handover.

In another example, the operating system 206 may include a telephony manager which tracks and maintains the state of each call made by the mobile device 208. The agent 222 may interrogate the telephony manager (e.g., submit an API request) and obtain state information, call data, or other information corresponding to active calls or other calls executed by the mobile device 208. The agent may then mirror (e.g., copy to active cache 234) the state, such as a call buffer, or other information obtained from the telephony manger and then perform the handover. The agent 222 may manage and provide the active cache 234 to the active container 214 and the update container 212, both the update container 212 and the active container 214 may have access to the active cache 234, and data and other information for both containers may be written to the active cache 234 before, during, and after handover operations. For example, once the agent 222 or other component of the mobile device 208, such as the operating system 206, determines to perform an update utilizing the update container 212, the agent may create the active cache 234 and begin mirroring or copying information to the active cache 234.

Figure 3:
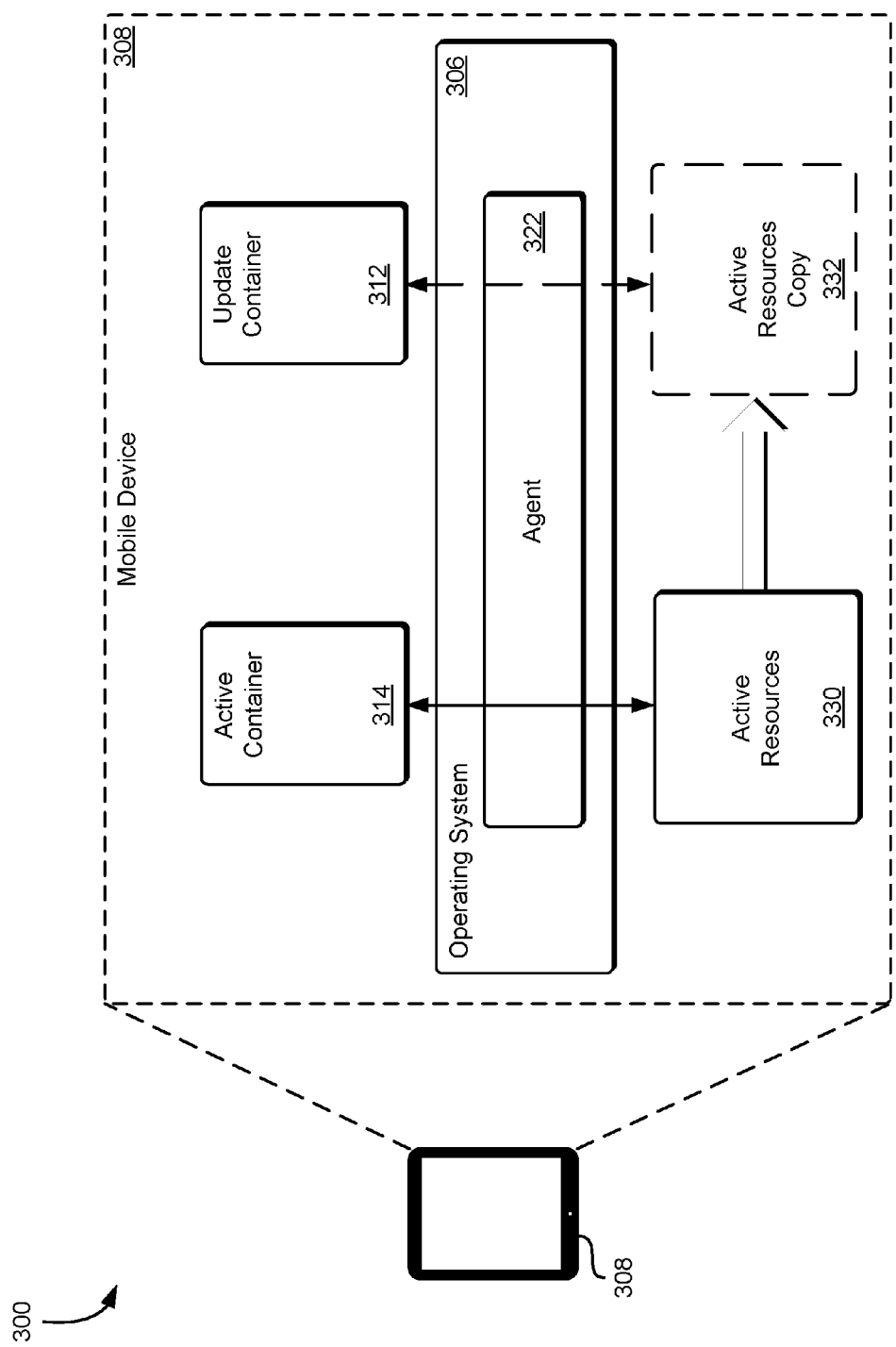
FIG. 3 illustrates an environment in which an agent executed by a mobile device may facilitate an active container handover in accordance with at least one embodiment.

FIG. 3 illustrates an aspect of an environment 300 in which embodiments may be practiced. As illustrated in FIG. 3, the environment 300 may include an agent 312 configured to implement an update to an application or software executed by a mobile device 308. The mobile device 308 may be any suitable computer system, mobile phone, smartphone, tablet, portable computer or combination thereof capable of supporting both physical hardware virtualization and software containerization. Furthermore, the mobile device 308 may include processors, memory, and other physical hardware, described in greater detail below, configured to enable the mobile device 308 to implement an operating system 306, agent 322, and a plurality of containers including an active container 314 and an update container 312. As illustrated in FIG. 3, the mobile device 308 may execute an active container 314 and an update container 312. The containers described in FIG. 3 may include various containers described in accordance with the present disclosure, such as those described above in connection with FIG. 1.

The active container 314 may be the container currently being utilized by the user of the mobile device 308. For example, the active container 314 may include an operating system such as Android® or iOS® which is configured to present the user with an interface for executing various applications and performing various operations, such as lacing phone calls or accessing a website. The active container 314 may include applications and/or other software that the user is currently interacting with or has interacted with in the past. In yet other embodiments, the active container 314 is a container with a version of an application, operating system, or other software that is to be updated and/or tested. In order to reduce the impact of this on the user, the operation involved in performing the update and/or test may be performed in the update container 312.

Furthermore, the resources of the mobile device 308 may be made available to other users and/or devices through virtualization of the resources and management of the virtualized resources by the agent 322. For example, the mobile device 308 may utilize the containers to provide a virtual operating system or application for users, and these users may then interact with the mobile device 308 through the virtual presence provided through the container. The agent 312 may be a component of the operating system 306 configured to manage the containers' access to physical resources of the mobile device 308 and perform various operations involved in the active handover between containers, such as the active container 314 and the update container 312. For example, the agent 322 may be a set of computer instructions or other logic configured to enable the active handover between the active container 314 and the update container 312 by at least making active resources 330 utilized by the active container 314 available to the update container 312. The active resources 330 may include memory, processors, storage location, storage devices, antennas, state information, application data, user data, user preferences, or any other computing resources utilized by one or more containers executed by the mobile device 308.

The agent 312 may also prioritize access to the active resources 330 and active resources copy 332 to particular containers based at least in part on one or more attributes of the containers described in greater detail below. For example, the active container 314 may have priority access to the active resources 330 prior to the handover and the update container 312 may have priority access to the active resources copy 332 after the handover. Furthermore, for the purposes of the present disclosure, in various embodiments when the agent 322 includes the set of computer instructions or other logic, performance of an operation by the agent 322 causes the underlying computer system (e.g., the mobile device 308) executing the set of computer instructions or other logic to perform the operation. The agent 322 may also be implemented by specialized hardware or virtualized hardware, such as a processor configured to perform the operations of the agent 322.

The operating system 306 may be any operating system suitable for running within the mobile device 308 and that provides isolation technology that enables containerization schemes to isolate virtualization instances, such as containers or software functions described in greater detail below, from other processes running under the operating system 306. Examples of such operating systems include various implementations of Linux® operating systems that support resource isolation features in the Linux kernel. As noted, the software functions and containers may be virtualized instances within the operating systems 306 launched from application images or other data objects in accordance with one or more task definitions, and may be allocated resources of the mobile device from the agent 322.

Alternatively or in addition to the shared caching mechanisms as described above in connection with FIG. 2, the agent 322 may provide a copy of the active resources 330 utilized by the active container 314 to the update container during the execution of a handover such that the current state of the update container 312 is identical to the active container 314. By at least providing the update container 312 with current state of the active container 314, the user may not experience an interruption, failure, or degradation of services and operations provided by the mobile device 308. For example, the current state, including all associated data of a telephone call, may be copied from the active resources 330 to the active resources copy 332, such that if the handover is performed during the phone call, the user of the mobile device 308 will not experience any call failures. In addition, the agent 322 may collect metric information and report the metrics information to another entity, such as a telecom provider or device manufacturer. The metric information may include information associated with the handover and the performance thereof.

The active resources 330 and active resources copy 332 may include any of the computing resources described herein and any state information associated with the user's current active session, such as application data generated by one or more software functions executed within the active container 314. The agent 322 may prioritize operations and/or requests required to generate the active resources copy 332, such that the operations do not utilize an amount of computing resources of the mobile device 308 that may cause a degradation of performance of the active container (e.g., the active user session). For example, as described in greater detail below, the agent 322 may associate a lower priority level to the update container 312 than the active container 314. The agent 322 may determine that a sufficient amount of the active resources 330 have been copied to the active resources copy 332 and may begin handover operations that cause the update container 312 to become the active user session. During the handover (e.g., while the agent is causing the update container 312 to become the active user session), the agent 322 may forward and/or copy all requests to the active container 314 to the update container 312 so that no requests or operations are lost during the handover.

Figure 4:
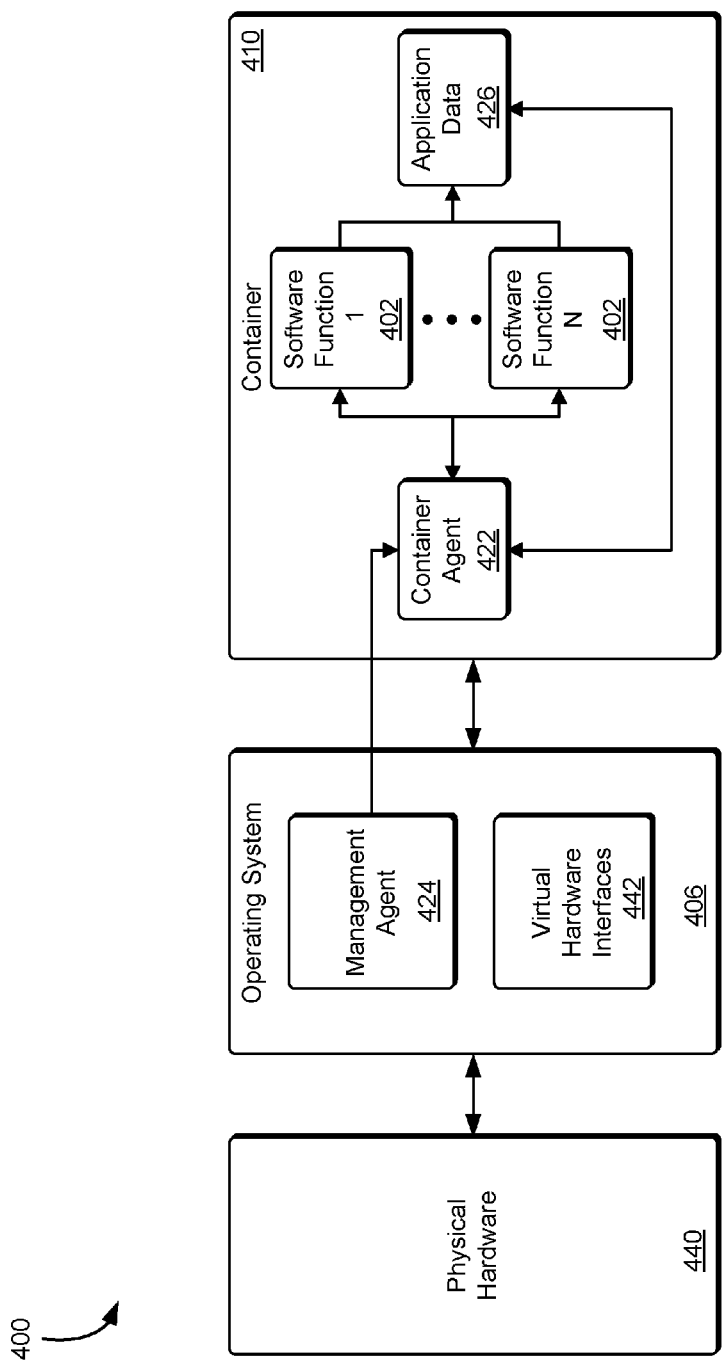
FIG. 4 illustrates an environment in which an agent executed by a mobile device may provide and manage virtualized hardware resources to containers executed by the mobile device in accordance with at least one embodiment.

FIG. 4 illustrates an aspect of an environment 400 in which embodiments may be practiced. As illustrated in FIG. 4, the environment 400 may include a set of software functions 402 launched within a container 410 being monitored by a container agent 422 and providing metrics and log information to a telemetry agent. As described above, the metrics and log information may be provided to an entity for various purposes, such as debugging and testing. In addition, the metric and log information may be utilized by a management agent 424 for various functions, such as determining the state of the container 410, copying the state of the container 410, and whether to perform various handover operations. The container agent 422, in turn, provides state information and/or other data to the management agent 424, such as application data 426. The state information and/or other data provided to the management agent 424 may be utilized by the management agent in various handover operations, including a shared cache or copy of active resources as described above. As an example of providing state information and/or application data from a first container to a second container during various handover operations, an operating system (e.g., Linux) may expand one or more control groups to allow memory access between two or more containers (e.g., the first and second container). Furthermore, the operating system's memory manager could be optimized to ensure that there are no segmentation faults or incorrect page allocations during these operations.

The software functions 402, similar to software functions discussed elsewhere in the present disclosure, may be running in virtualization instance environments (also referred to as tasks) of varying lifespans (e.g., short-term batch jobs, long-term background processes, etc.) that have been isolated from other processes within the container 410. Metrics about the software functions 402 may be gathered by the container agent 422, aggregated, and provided to the management agent 424. The container agent 422 acts as a go-between between the software functions 402 and resources, services, virtual hardware interfaces 442, and other entities outside the namespace of the software functions 402. In some implementations, the software functions 402 may be configured to share external resources (e.g., virtual hardware interfaces 442), such as block-level data storage volumes, memory, processors, antennas, and other computing resources of the mobile device 408. In some of these implementations, access to and communication with the shared external resources by the software functions 402 may be made through the container agent 422. In other implementations, the container 410 or operating system of the container 410 may support allowing the software functions 402 to access or communicate with the shared resources without going through the container agent 422.

The management agent 424 may further be configured to apply a set of rules to determine within which container 410 that software functions 402 should be launched or is currently executing. For example, when the container 410 is instantiated, its container agent 422 may notify the management agent 424 that the container 410 is available for hosting software functions for a user or for performing an update to an application. Thereafter, the management agent 424 may determine whether to execute an update and assign a priority level to the container 410, described in greater detail below. The management agent 424 may also be configured to determine what actions should be taken in response to certain types of container events or handover operations. For example, after a handover is completed, if one of the software functions 402 malfunctions and/or ceases operation, the management agent 424 may determine to re-launch the malfunctioning or inoperative software function 402 or failover to a previous container.

As noted, the management agent 424 may be configured to provide an environment for other processes supporting the software functions 402 and containers 410. The container agent 422 may be configured to provide lifecycle and health information about the software functions 402 being monitored by the container agent 422 to the management agent 424. Furthermore, the container agent 422 may be a software function that is launched when the container instance is created, and in other cases the container agent 422 may be a process running under the operating system of the container instance 410 in communication with the software functions 402.

Returning to FIG. 4, the container 410 may access the physical hardware 440 of the mobile device through virtual hardware interface 442 provided by the operating system and managed by the management agent 424. The virtual hardware interfaces 442 may include virtual device drivers or other interfaces configured to enable the container 410 to access physical hardware 440. The physical hardware 440 may include processors, memory, or other computing resources described in greater detail below. The container agent 422 may transmit requests, by the software functions 402, to utilize physical hardware 440 of the mobile device to the virtual hardware interfaces 442. The virtual hardware interfaces 442 may then translate and/or provide the request to the physical hardware 440 for processing. For example, the virtual hardware interfaces 442 may include a virtual antenna interface, and a request to utilize the antenna may be obtained from the software functions 402 of the container 410. The request may then be provided to the antenna and processed. In addition, the virtual hardware interfaces 442 or a portion thereof may be executed within the container 410. Furthermore, the virtual hardware interfaces 442 may be included in the resources copied and/or included in the shared cache during handover operations.

Figure 5:
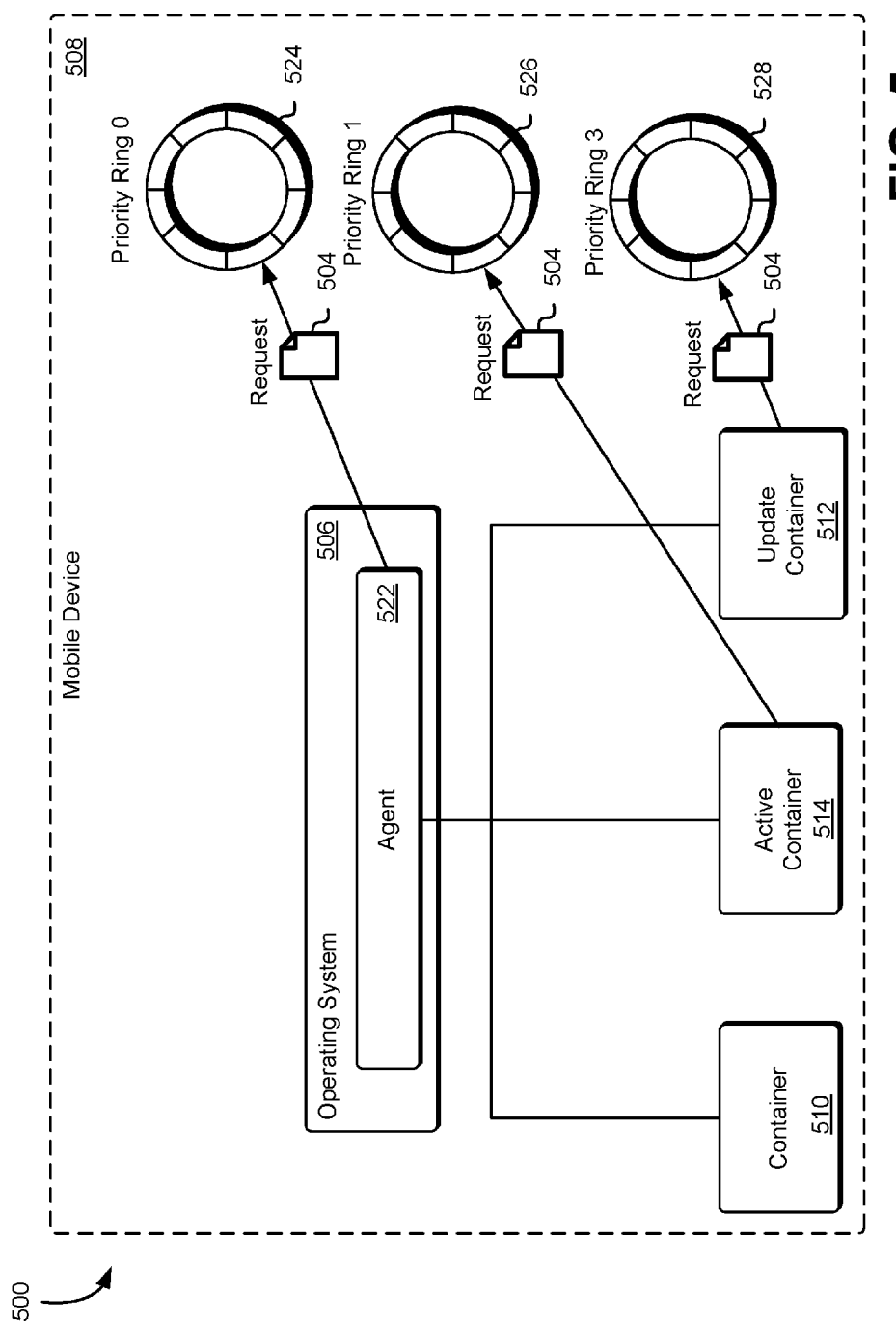
FIG. 5 illustrates an environment in which an agent executed by a mobile device may support containers executed by the mobile device in accordance with at least one embodiment.

FIG. 5 illustrates an aspect of an environment 500 in which embodiments may be practiced. As illustrated in FIG. 5, the environment 500 may include a user's mobile device 508 that may include a plurality of containers 510 including an update container 512 and an active container 514. The mobile device 508 may be any suitable computer system, mobile phone, smartphone, tablet, portable computer, or combination thereof capable of supporting both physical hardware virtualization and software containerization. Furthermore, the mobile device 508 may include processors, memory, and other physical hardware, described in greater detail below, configured to enable the mobile device 508 to implement an operating system 506, agent 522, and containers 510.

As illustrated in FIG. 5, the agent 522 may manage priority rings and/or priority queuing mechanisms. In the example, illustrated in FIG. 2, the agent 522 manages priority ring zero 524, priority ring one 526, and priority ring two 528. Priority ring zero 524 may have the highest priority, and requests 504 placed in priority ring zero 524 may be processed before requests 504 placed in priority ring one 526 and/or priority ring two 528. Similarly, requests 504 placed in priority ring one 526 may be processed before requests 504 placed in priority ring two 528. In various embodiments, all requests 504 from a higher priority ring (e.g., lower ring number) are processed before any request from a lower priority ring. For example, all requests 504 placed in priority ring zero 524 are processed before any request 504 placed in priority ring one 526 or priority ring two 528.

As described herein, various priority queuing mechanisms may be used by the agents 522 or other component of the operating system to manage limited resources of the mobile device 508, such as bandwidth of the antennas or processing resources. In the event of requests 504 queuing due to insufficient bandwidth or resources, all other queues (e.g., priority ring one 526 and priority ring two 528) may be halted to process requests 504 from the highest priority queue (e.g., priority ring zero 524) upon arrival. This may ensure that the prioritized traffic and/or user traffic (such as real-time traffic, e.g. a data stream of a VoIP connection or telephony connection) is forwarded with the least delay and the least likelihood of being rejected due to a queue reaching its maximum capacity. All other traffic may be handled when the highest priority queue (e.g., priority ring zero) is empty. Alternatively, in some embodiments, a disproportionate amount of requests 504 from higher priority queues (e.g., priority ring zero 524 and priority ring one 526) are processed relative to the lower priority requests (e.g., priority ring one 526 and priority ring two 528).

The request 504 may be a request to transmit data, access memory, process information, or any other requests 504 that may be processed by the mobile device 508. Furthermore, the requests 504 may include other requests to access the physical resources of the mobile device 508. The requests 504 may be provided to a virtual device driver, such as the virtual antenna interface or other virtual hardware interface as described above. The agent 522 may assign a priority level to each container 510. For example, the agent may assign an active user session (e.g., active container 514) to priority ring one 526 so that other containers 510, such as the update container 512, do not interfere with the user's operation of the mobile device 508. The agent 522 may be assigned, by the operating system 506, the highest priority (e.g., priority ring zero 524) so that management of the handover between the active container 514 and the update container 512, as well as other containers 510, are not delayed or interfered with. Requests 504 from the agent 522 may be transmitted directly to the physical hardware of the mobile device 508, or may be processed through a virtual device driver exposed to the agent 522.

Once a priority level has been assigned to a container, all requests 504 from that container may be directed to the appropriate priority queue or priority ring. The agent 522 may modify or otherwise change a priority level associated with a particular container. Furthermore, although as illustrated in FIG. 5, the requests 504 transmitted by the containers 510 are provided directly to the associated priority queue or priority ring, and the requests 504 may be first received by the agent 522 other component of the operating system 506 (e.g., virtual device driver or virtual antenna interface) and then provided to the associated priority ring. In this manner, the agent may dynamically determine a priority level for each request 504 regardless of which container 510 may have provided the request. Furthermore, the agent may dynamically determine a priority level for each container 510, including the active container 514 and the update container 512.

Additionally, particular applications or executable instructions implemented and/or executed within a particular namespace (e.g., a particular container or particular operating system) may have been assigned or have been provided with a different priority level than the namespace under which the application is executing. For example, a particular container may be assigned to priority ring two 528; however, a particular application, such as an user application, may be assigned to priority ring one 526, such that all requests transmitted by the containers are queued in priority ring two 528, while all requests transmitted by the particular application, despite being transmitted from the container, are queued in priority ring one 526. In another example, a security update for an application of the mobile device 508 may be assigned the highest priority and as a result regardless of the priority ring assigned to the container 510 executing the security update, request associated with the security update may be assigned to priority ring zero 524. In some embodiments, requests 504 may be latched or otherwise associated such that the execution of one request causes the execution of one or more latched requests. For example, the processing by the mobile device 508 or component thereof, such as a processor, of a request in priority ring one 526 may cause a set of associated requests in priority ring two 528 to be processed and/or re-prioritized for quicker processing.

Although the use of priority rings and priority queues is illustrated in FIG. 5, other mechanisms for dividing the physical resources of the mobile device 508 may be used in accordance with the various embodiments described herein. For example, the agent 522 or operating system 506 may split the physical resources of the mobile device 508 between containers 510 based at least in part on a time division mechanism. In such embodiments, the agent divides container access to the physical resources of the mobile device 508 based at least in part on a 'share' of time allotted to each container or other application or executable code executed by the mobile device. For example, the agent 522 may allocate 60% of the physical resources time (e.g., time used for processing requests 504) to the operating system 506, 30% of the physical resources time to an active user container, and the remaining 10% of the physical resources time to an update container. In another example, the agent 522 may divide the physical resources based at least in part on a bandwidth of the physical resources or other performance metrics. In various embodiments, the agent 522 determines a total amount of bandwidth available to the mobile device 508 from one or more antennas of the mobile device 508 and splits the container's 510 access to the antennas based at least in part on a measure of bandwidth to provide each container. For example, a first container may be provided access to 256 kilobytes per second (Kbps) out of a total of 1 megabyte per second Mbps of total bandwidth available to the mobile device 508. The techniques described herein for dividing physical resources of a mobile device 508 between containers 510 may be utilized for the division of any computing resources, both physical and virtual, of the mobile device 508 simultaneously. For example, the techniques described herein may be used to divide physical antenna resources, physical processor resources, and virtual software resources simultaneously on the mobile device 508.

Figure 6:
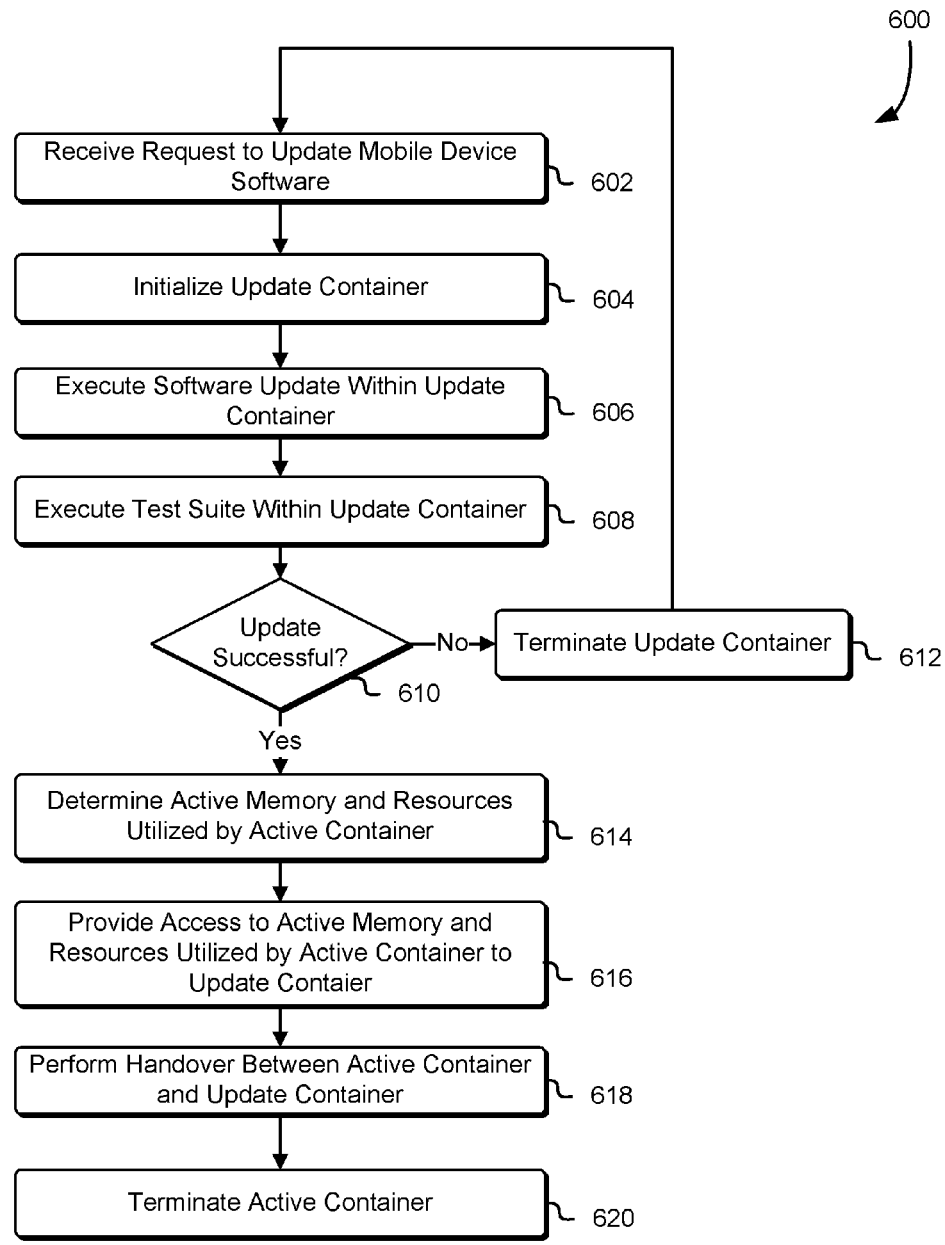
FIG. 6 is an illustrative example of a process for performing an active container handover in accordance with at least one embodiment.

FIG. 6 shows an illustrative process 600 which may be used to perform a blue-green deployment and/or update of applications, operating systems, or other executable code of a mobile device in accordance with at least one embodiment. The process 600 may be performed by any suitable system, such as an agent described above in FIGS. 1-5 or any combination of systems or components thereof, such as an operating system as described above. Returning to FIG. 6, in an embodiment, the process 600 includes receiving a request to update software or other executable code of a mobile device 602. The request may be received from an entity outside of the mobile device, such as a software developer, device manufacturer, or telecom company. Additionally, the request may be received from an operating system or other component of the mobile device. For example, an application store executing on the mobile device may determine that at least one other application executed by the mobile device has a software update available and may transmit a request to the agent to update the application.

The agent may then initialize an update container 604. Initializing the update container may include providing an image of the container and included application to the operating system for execution. In addition, the agent may determine a priority level associated with the update container as described above. The agent may then cause the update container to execute the software update within the update container 606. The software update may include a variety of operations, such as loading executable code into memory of the mobile device or modifying or altering executable code previously loaded into memory of the mobile device. The container or other application may execute the update. For example, the container may be initialized with an application configured to execute the update received by the container.

After executing the software update, the agent may cause the update container to execute a test suite 608. The test suite may be executed automatically after completion of the update or may require the agent or other component of the mobile device to commence execution of the test suite. The test suite may be configured to provide an indication of whether the software update completed successfully. The agent may then determine if the update completed successfully 610. The agent may determine if the update completed successfully based at least in part on the results of one or more test operations (e.g., the test suite described above) and/or obtaining metrics and log information from the update container as described above. If the update was not completed successfully, the agent may terminate the update container 612 and attempt to update the software again in a second container. Other remedial operations may be performed in connection with the process 600.

Returning to FIG. 6, once the agent determines that the update has been completed successfully, the agent may then determine active memory and resources utilized by one or more active containers 614. The active containers may include any container utilized by the user of the mobile device to perform one or more functions or operations. Determining the active memory and resources may include submitting API request or other requests to the operating system or active containers of the mobile device. The memory and resource may include various computing resources of the mobile device described herein. The agent may then provide access to the active memory and resources to the update container 616. This may include storing the active memory and resources in a shared cache or generating a copy of the active memory and resources as described above. For at least a portion of the active resources and memory, the update container may be provided access directly. For example, the agent may provide the update container with access to one or more antennas of the mobile device for which the active containers also had access.

The agent may then perform a handover between the active containers and the update container 618. The handover may include forwarding request to the update container or otherwise causing the update container to be the active user session. At some point in time after completion of the handover, the agent may then terminate the containers that are no longer utilized by the user 620. As discussed above, the agent may wait some interval of time prior to terminating containers to ensure that the user is no longer utilizing the containers.

Figure 7:
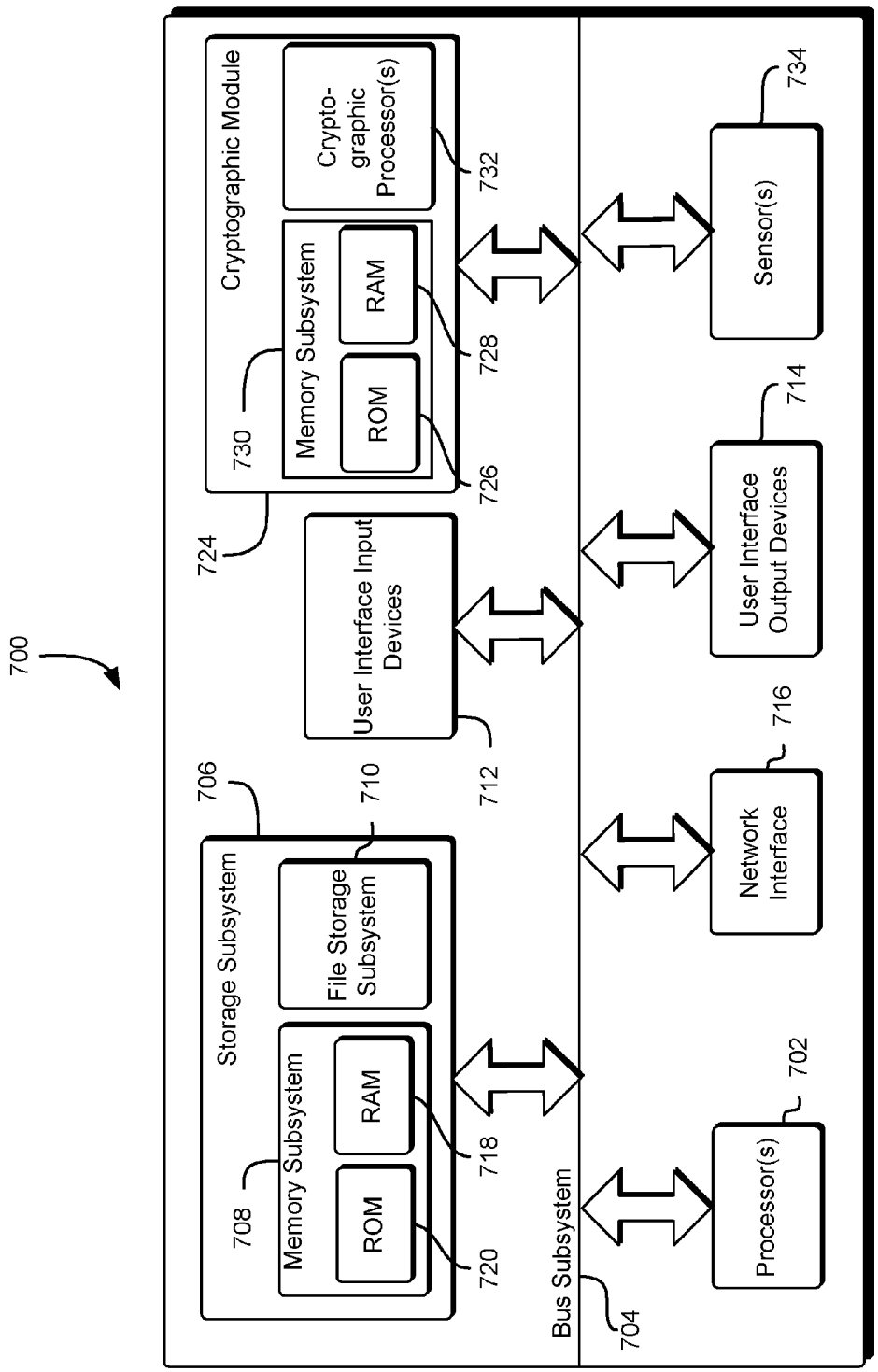
FIG. 7 shows an illustrative example of components of a computing device in accordance with at least one embodiment.

FIG. 7 is an illustrative, simplified block diagram of an example device 700 that may be used to practice at least one embodiment of the present disclosure. In various embodiments, the device 700 may be used to implement any of the systems illustrated herein and described above. For example, the device 700 may be used to implement a mobile device and other applications, such as a container or software function, in accordance with various embodiments. As shown in FIG. 7, the device 700 may include one or more processors 702 that may be configured to communicate with and are operatively coupled to a number of peripheral subsystems via a bus subsystem 704. These peripheral subsystems may include a storage subsystem 706, comprising a memory subsystem 708, a file storage subsystem 710, one or more user interface input devices 712, one or more user interface output devices 714, a network interface subsystem 716, a cryptographic module 724 comprising a memory subsystem 730, and one or more cryptographic processors 732. The peripheral subsystems may also include one or more sensors 734 in addition to sensors of input devices 712. Such sensors may include, but are not limited to, GPS sensors, accelerometers, temperature sensors, and others.

The bus subsystem 704 may provide a mechanism for enabling the various components and subsystems of device system 700 to communicate with each other as intended. Although the bus subsystem 704 is shown schematically as a single bus, alternative embodiments of the bus subsystem may utilize multiple busses.

The network interface subsystem 716 may provide an interface to other device systems and networks. The network interface subsystem 716 may serve as an interface for receiving data from and transmitting data to other systems from the device system 700. For example, the network interface subsystem 716 may enable transmission of application data and other information, such as electronic requests to access a system (e.g., receive a webpage) and may enable receipt of responses to the requests, such as webpages or other information. The network interface subsystem 716 may also facilitate the receipt and/or transmission of data on other networks, such as an organization's intranet and/or other networks described below. The network interface 716 may include a plurality of antennas such as IEEE 802.11n (Wi-Fi)®, IEEE 802.11ac (Wi-Fi)®, HSPA+ (3G), WiMAX (4G), Long Term Evolution (4G), near field communications (NFC), and any other antenna systems configured to transmit and receive data.

The user interface input devices 712 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in consuming applications, as described above. Input devices may include, for instance, magnetic or other card readers, one or more USB interfaces, near field communications (NFC) devices/interfaces and other devices/interfaces usable to obtain data from other devices. In general, use of the term "input device" is intended to include all possible types of devices and mechanisms for inputting information to the device system 700.

User interface output devices 714, if any, may include a display subsystem, or non-visual displays, such as audio and/or tactile output devices, etc. Generally, the output devices 714 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device system 700. The output device(s) 714 may be used, for example, to present user interfaces to facilitate user interaction with applications performing processes described herein and variations therein, when such interaction may be appropriate. While a device 700 with user interface output devices is used for the purpose of illustration, it should be noted that the device 700 may operate without an output device, such as when the device 700 is operated in a server rack and, during typical operation, an output device is not needed.

The storage subsystem 706 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure and may be stored in the storage subsystem 706. These application modules or instructions may be executed by the one or more processors 702. The storage subsystem 706 may additionally provide a repository for storing data used in accordance with the present disclosure. The storage subsystem 706 may comprise a memory subsystem 708 and a file/disk storage subsystem 710.

The cryptographic module 724, which may be a trusted platform module (TPM), includes a memory subsystem 730, including a main random access memory (RAM) 728 for storage of instructions and data during program execution and a read-only memory (ROM) 726, in which fixed cryptographic information may be stored, such as a hardware secret stored securely within the device 700 so as to be non-exportable (i.e., inaccessible through any call to the cryptographic module 724). The cryptographic module 724, in some embodiments, operates wholly or partly in compliance with Trusted Computing Group's TPM Main Specification level 2, Version 1.2, Revision 116, TPM Main Specification level 2, Version 1.2, Revision 103, and/or ISO/IEC 11889, which are incorporated herein by reference. The device 700 may also store cryptographic keys in RAM 728 and/or processor registers for temporary cryptographic processing. The cryptographic information stored in memory may be used in combination with cryptographic information obtained via the network interface 716 and/or one or more of the user interface input devices 712. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure. Generally, one or more components of the cryptographic module 724 may be configured to collectively perform various operations used generating cryptographically verifiable information for authentication objects.

As noted above, in various embodiments of the present disclosure, hardware secrets are securely stored within the cryptographic module 724. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF, and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs, and/or other devices whose physical characteristics encode information usable as or for a hardware secret.

Figure 8:
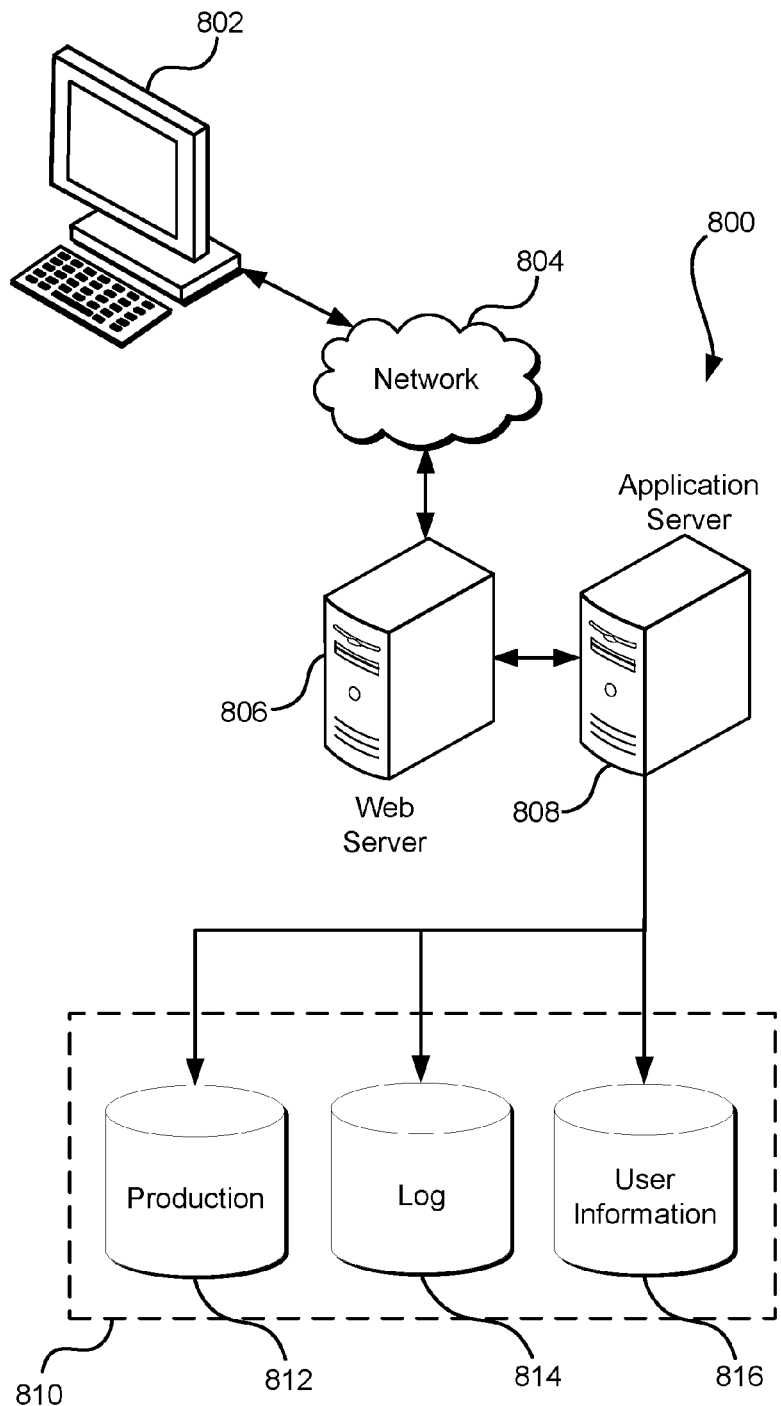
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   initializing an update container configured to update executable code associated with an active container, the update container and the active container being virtualization environments, where the active container is associated with one or more operations of an active user session and the active container is assigned a higher priority than the update container;
   providing the active container with a greater share of a division of physical resources than the update container;
   executing an update of executable code corresponding to the update container;
   determining that the update completed successfully based at least in part on information obtained from the update container;
   determining a current state and a set of resources associated with the active container;
   providing the update container with access to the current state and the set of resources associated with the active container;
   performing a handover between the active container and the update container such that the update container executes one or more operations of the active user session; and
   terminating the active container.

2. The computer-implemented method of claim 1, wherein providing the update container with access to the current state and the set of resources associated with the active container further comprises maintaining the current state and the set of resources in a shared cache accessible to the update container and active container.

3. The computer-implemented method of claim 2 further comprises pruning, after terminating the active container, the shared cache to reduce an amount of memory required to maintain the share cache.

4. The computer-implemented method of claim 1, wherein terminating the active container further comprises waiting an interval to ensure that a user associated with the active user session is no longer utilizing the active container.

5. A system, comprising:
   one or more processors; and
   a memory that includes instructions that, as a result of being executed by the one or more processors, cause the system to:
      instantiate a first container on the system;
      update an application within the first container, the application executed by a second container executed by the system, the first container and the second container being virtualization environments;
      provide the second container that is assigned a higher priority than the first container with a greater share of a division of a set of resources than the first container;
      determine that the update completed successfully;
      provide the first container with access to state information generated by the second container and the set of resources associated with the second container;
      cause the first container to be an active container that executes one or more operations associated with the second container; and
      terminate the second container.

6. The system of claim 5, wherein providing the first container with access to state information generated by the second container further comprises copying state information obtained from the second container to a memory location associated with the first container.

7. The system of claim 5, wherein the memory further includes instructions that, as a result of being executed by the one or more processors, cause the system to, prior to causing the first container to be the active container, prioritize requests from the second container over request from the first container.

8. The system of claim 5, wherein the memory further includes instructions that, as a result of being executed by the one or more processors, cause the system to:
receive a request from a third container, where requests from the third container are prioritized lower than requests from the second container, and the request is associated with an application executed by the third container; and
prioritize the request over one or more other requests obtained from the second container as a result of the request being associated with the application.

9. The system of claim 8, wherein the memory further includes instructions that, as a result of being executed by the one or more processors, cause the system to:
determine an interval of time to allow to elapse prior to terminating the second container; and
wherein terminating the second container further comprises determining the interval of time has elapsed.

10. The system of claim 9, wherein the memory further includes instructions that, as a result of being executed by the one or more processors, cause the system to:
detect an error during execution of the first container prior to expiration of the interval of time; and
cause the second container to be the active container.

11. The system of claim 5, wherein providing the first container with access to state information generated by the second container further comprises providing application data obtained from one or more application executed by the second container to the first container.

12. The system of claim 5, wherein the memory further includes instructions that, as a result of being executed by the one or more processors, cause the system to, during one or more handover operations, forward requests directed to the second container to the first container.

13. A non-transitory computer-readable storage medium having stored thereon executable instructions that, as a result of being executed by one or more processors of a computer system, cause the computer system to at least:
receive a request to update a version of an application executing in a first container;
instantiate a second container, the first container and the second container being virtualization environment;
provide the first container that is assigned a higher priority than the second container with a greater share of a division of a set of resources than the second container;
provide the second container with an update to the version of the application;
determine that an update of the version of the application was performed;
provide the second container with access to a current state of the first container and the set of resources associated with the first container;
execute a handover between the first container and the second container such that the second container executes one or more operations associated with the first container; and
terminate the first container.

14. The non-transitory computer-readable storage medium of claim 13, wherein the instructions that cause the computer system to provide the second container with access to the current state of the first container further include instructions that cause the computer system to copy the current state to the second container.

15. The non-transitory computer-readable storage medium of claim 14, wherein the instructions that cause the computer system to copy the current state to the second container further include instructions that cause the computer system to copy virtual device drivers from the first container to the second container.

16. The non-transitory computer-readable storage medium of claim 13, wherein the instructions that cause the computer system to determine that the update was performed further include instructions that cause the computer system to perform one or more test operations to determine that the update was performed.

17. The non-transitory computer-readable storage medium of claim 16, wherein the instructions that cause the computer system to perform the one or more test operations further include instructions that cause the computer system to failover from the second container to the first container based at least in part on a test operation of the one or more test operations failing.

18. The non-transitory computer-readable storage medium of claim 13, wherein the instructions that cause the computer system to provide the second container with access to the current state of the first container further include instructions that cause the computer system to provide a shared cache to the first container and the second container.

19. The non-transitory computer-readable storage medium of claim 18, wherein the instructions that cause the computer system to execute the handover between the first container and the second container further include instructions that cause the computer system to, during the handover, transmit request directed to the first container to both the first container and the second container.

20. The non-transitory computer-readable storage medium of claim 18, wherein the instructions further comprise instructions that, as a result of being executed by the one or more processors, cause the computer system to prune the shared cache.

* * * * *